United States Patent
Martinez-Bonastre et al.

(10) Patent No.: US 12,456,738 B2
(45) Date of Patent: Oct. 28, 2025

(54) CATALYST FOR A FUEL CELL

(71) Applicant: Johnson Matthey Hydrogen Technologies Limited, London (GB)

(72) Inventors: Alejandro Martinez-Bonastre, Reading (GB); Rachel O'Malley, Reading (GB); Brian Theobald, Reading (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 904 days.

(21) Appl. No.: 17/310,628

(22) PCT Filed: Mar. 20, 2020

(86) PCT No.: PCT/GB2020/050743
§ 371 (c)(1),
(2) Date: Aug. 13, 2021

(87) PCT Pub. No.: WO2020/193958
PCT Pub. Date: Oct. 1, 2020

(65) Prior Publication Data
US 2022/0181643 A1    Jun. 9, 2022

(30) Foreign Application Priority Data
Mar. 22, 2019    (GB) .................................. 1903950

(51) Int. Cl.
H01M 4/92    (2006.01)
B01J 35/45   (2024.01)
H01M 4/88    (2006.01)

(52) U.S. Cl.
CPC ............. *H01M 4/921* (2013.01); *B01J 35/45* (2024.01); *H01M 4/8807* (2013.01); *H01M 4/926* (2013.01)

(58) Field of Classification Search
CPC .............................. H01M 4/921; H01M 4/926
(Continued)

(56) References Cited

U.S. PATENT DOCUMENTS 5,232,891 A   *  8/1993  Hormann .............. C01C 3/0233
                                                      502/331
11,973,232 B2 *  4/2024  Steinbach ........... H01M 4/8621
(Continued)

FOREIGN PATENT DOCUMENTS

EP    0631337 A2    12/1994
EP    3942635 A1    1/2022
(Continued)

OTHER PUBLICATIONS

Sohn, Yeonsun, et al. "Dealloyed PtCu catalyst as an efficient electrocatalyst in oxygen reduction reaction." Current Applied Physics 15.9 (2015): 993-999. (Year: 2015).*
(Continued)

*Primary Examiner* — Jonathan G Leong
*Assistant Examiner* — Christine Disney
(74) *Attorney, Agent, or Firm* — BakerHostetler

(57) ABSTRACT

The present invention provides a process for preparing a catalyst precursor, said process comprising the steps of (i) providing $Pt_aX_b$ alloy particles on a support material and (ii) applying a shell of X to the $Pt_aX_b$ alloy particles to provide a catalyst precursor comprising particles having a $Pt_aX_b$ core and an X shell. The ratio of a to b is in the range of and including 10:1 to 1:2.5 and X is Co, Ni, Y, Gd, Sc or Cu. Also provided is a process for preparing a catalyst material.

7 Claims, 3 Drawing Sheets

(58) Field of Classification Search
USPC .................................. 502/101, 326, 331, 334
See application file for complete search history.

(56) References Cited

U.S. PATENT DOCUMENTS

| | | | |
|---|---|---|---|
| 2013/0059231 A1 | 3/2013 | Hwang et al. | |
| 2014/0186744 A1 | 7/2014 | Franco et al. | |
| 2015/0086902 A1 | 3/2015 | Hards | |
| 2015/0255802 A1 | 9/2015 | Kim | |
| 2016/0104898 A1* | 4/2016 | Bonastre | H01M 8/1004 502/301 |

FOREIGN PATENT DOCUMENTS

| | | |
|---|---|---|
| GB | 2015/050864 W | 3/2015 |
| JP | 2012240000 A | 12/2012 |
| WO | 00/24074 A1 | 4/2000 |
| WO | 2012/110875 A2 | 8/2012 |
| WO | 2020193958 A1 | 10/2020 |

OTHER PUBLICATIONS

Strasser, P., & Kuhl, S. (2016). Dealloyed Pt-based core-shell oxygen reduction electrocatalysts. Nano Energy, 29, 166-177. (Year: 2016).*

Sohn Yeonsun, et al., "Dealloyed PtCu catalyst as an efficient electrocatalyst in oxygen reduction reaction", Current Appli Ed Physics, North-Holland, Amsterdam, NL, vol. 15, No. 9, May 30, 2015, pp. 993-999, abstract, p. 994, paragraph 2, Experimental details.

P. Mani, et al., "Dealloyed Pt—Cu Core-Shell Nanoparticle Electrocatalysts for Use in PEM Fuel Cell Cathodes", Journal of Physical Chemistry C, vol. 112, No. 7, Feb. 21, 2008, pp. 2770-2778, abstract, p. 2771, paragraph 2, Experimental Methods.

Dubau, et al., "Nanoscale compositional changes and modification of the surface reactivity of Pt"3Co/C nanoparticles during proton-exchange membrane fuel cell operation", Electrochimica Acta, Elsevier, Amsterdam, NL, vol. 56, No. 2, 2010-12-30, abstract, p. 777, paragraph 2, Experimental—p. 778.

Yoon, et al. "Synthesis of bare Pt3Ni nanorods from PtNi@Ni core-shell nanorods by acid etching: one-step surfactant removal and phase conversion for optimal electrochemical performance toward oxygen reduction reaction", CrystEngComm, Royal Society of Chemistry, pp. 6002-6007, 2016.

Zhang, et al. "Tuning Pt-skin to Ni-rich surface of Pt3Ni catalysts supported on porous carbon for enhance oxygen reduction reaction and formic electro-oxidation", ScienceDirect, Elsevier, Nano Energy, vol. 19, pp. 198-209, 2016.

Mani, et al., "Dealloyed Pt—Cu Core-Shell Nanoparticle Electrocatalysts for Use in PEM Fuel Cell Cathodes", J. Phys. Chem. C, 112, 7, pp. 2770-2778, 2008.

Dubau, et al., "Nanoscale compositional changes and modification of the surface reactivity of Pt3Co/C nanoparticles during proton-exchange membrane fuel cell operation", Electrochimica Acta, vol. 56, Issue 2, pp. 776-783, 2010.

Chen et al: "Tuning the decarboxylation selectivity for deoxygenation of vegetable oil over Pt—Ni bimetal catalysts via surface engineering", Catalysis Science Technology, Royal Society of Chemistry, vol. 8, 2018, 1126-1133.

* cited by examiner

CATALYST FOR A FUEL CELL

FIELD OF THE INVENTION

The present invention relates to a process for preparing an improved catalyst material, in particular an improved catalyst material for the oxygen reduction reaction at the cathode of a fuel cell.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Conventionally, the MEA can be constructed by a number of methods outlined hereinafter:
(i) The electrocatalyst layer may be applied to the gas diffusion layer to form a gas diffusion electrode. A gas diffusion electrode is placed on each side of an ion-conducting membrane and laminated together to form a five-layer MEA;
(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.
(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of MEAs are required to provide enough power for most applications, so multiple MEAs are assembled to make up a fuel cell stack. Flow field plates are used to separate the MEAs. The plates perform several functions: supplying the reactants to the MEAs; removing products; providing electrical connections; and providing physical support.

Electrocatalysts for fuel oxidation and oxygen reduction are typically based on platinum or platinum alloyed with one or more other metals. The platinum or platinum alloy catalyst can be in the form of unsupported nanometre sized particles (for example metal blacks) or can be deposited as discrete nanoparticles onto a support material (a supported catalyst), which results in a very high metal surface area. Electrocatalysts can also be in the form of coatings or extended films deposited onto a support material. There is a continual search for catalysts, particularly oxygen reduction catalysts, that have improved activity and/or stability, and that therefore utilise the expensive platinum catalyst more effectively. This enables the MEA performance to be increased or the loading (and therefore cost) of the catalyst employed in the MEA to be decreased, or a combination of both benefits.

A wide range of catalysts concepts, such as Pt binary alloys, Pt monolayer catalysts, Pt skin catalysts, and nanostructured thin-film (NSTF) catalysts have been investigated over the last decade. Another approach to high activity catalysts reported in recent years is that of the de-alloying Pt-M concept—materials obtained by the synthesis of base-metal (M) rich particles which are subjected to a selective leaching process of the less noble-metal from the particle surface. The resulting platinum-rich shells of the de-alloyed electrocatalyst particles exhibit compressive strain which, via electronic effects, leads to a highly active oxygen reduction reaction (ORR) catalyst. Promising performance in both rotating disk electrodes (RDE) and MEA experiments have been reported. However, there remains a need to design further improved catalysts with better control over the structure of the platinum-rich shells and the underlying core materials to enable further enhancement of the activity and stability of such catalysts.

De-alloyed binary $PtNi_3$ catalysts supported on carbon are known as cathode catalysts for fuel cell applications as documented by Myers et al. in Journal of The Electrochemical Society, 165 (6) F3316-F3327 (2018) and Ramaker et al. in J. Phys. Chem. C 2015, 119, 757-765. However, a step of annealing at about 1000° C. is required to form a suitably active alloy. This high temperature annealing can cause sintering, which reduces the metal surface area and hence reduces catalyst activity per unit mass of Pt.

SUMMARY OF THE INVENTION

It is an object of the present invention to provide a process for preparing an improved catalyst, and in particular a process for preparing an improved catalyst for the oxygen reduction reaction at the cathode of a fuel cell. In particular, the improved catalyst prepared by the process demonstrates increased performance and stability.

Accordingly, a first aspect of the invention provides a process for preparing a catalyst precursor, said process comprising the steps of:
(i) providing $Pt_aX_b$ alloy particles on a support material;
(ii) applying a shell of X to the $Pt_aX_b$ alloy particles to provide a catalyst precursor comprising particles having a $Pt_aX_b$ core and an X shell;
wherein the ratio of a to b is in the range of and including 10:1 to 1:2.5; and
wherein X is Co, Ni, Y, Gd, Sc or Cu.

A catalyst precursor in the context of the present invention is a material from which a catalyst material, for example the catalyst material obtainable by the process of the second aspect of the invention, can be prepared by carrying out additional transformation steps.

A second aspect of the invention provides a process for preparing a catalyst material, said process comprising the steps of:
(i) providing $Pt_aX_b$ alloy particles on a support material;
(ii) applying a shell of X to the $Pt_aX_b$ alloy particles to provide a catalyst precursor comprising particles having a $Pt_aX_b$ core and an X shell; then
(iii) heating the catalyst precursor at a temperature of no more than 900° C.; then
(iv) subjecting the material produced in step (iii) to conditions sufficient to leach a portion of metal X from the material,
wherein the ratio of a to b is in the range of and including 10:1 to 1:2.5; and
wherein X is Co, Ni, Y, Gd, Sc or Cu.

It will be appreciated that steps (i) and (ii) of the second aspect of the invention correspond to steps (i) and (ii) of the first aspect of the invention. Accordingly, all features discussed herein are combinable with the first and second aspects of the invention. However, steps (iii) and (iv) are not required in the first aspect of the invention.

The catalyst material obtainable by the process of the invention has particular use in a catalyst layer, for example for use in a gas diffusion electrode of an electrochemical cell, such as a fuel cell, in particular a proton-exchange membrane fuel cell (PEMFC).

Accordingly, also provided is a catalyst material obtainable by the process of the second aspect of the invention, along with a catalyst layer comprising the catalyst material.

Also provided is a catalyst coated membrane comprising the catalyst layer of the invention and an ion-conducting membrane, and a gas diffusion electrode comprising the catalyst layer of the invention and a gas diffusion layer.

Also provided is a membrane electrode assembly (MEA) comprising the catalyst layer or the catalyst coated membrane, or the gas diffusion layer of the invention.

Also provided is a fuel cell comprising the MEA of the invention, the gas diffusion layer, the catalyst coated membrane or the catalyst layer of the invention.

The catalyst material of the invention may be used at either the anode or the cathode of a fuel cell, particularly the cathode.

DETAILED DESCRIPTION OF THE INVENTION

Figure 1:
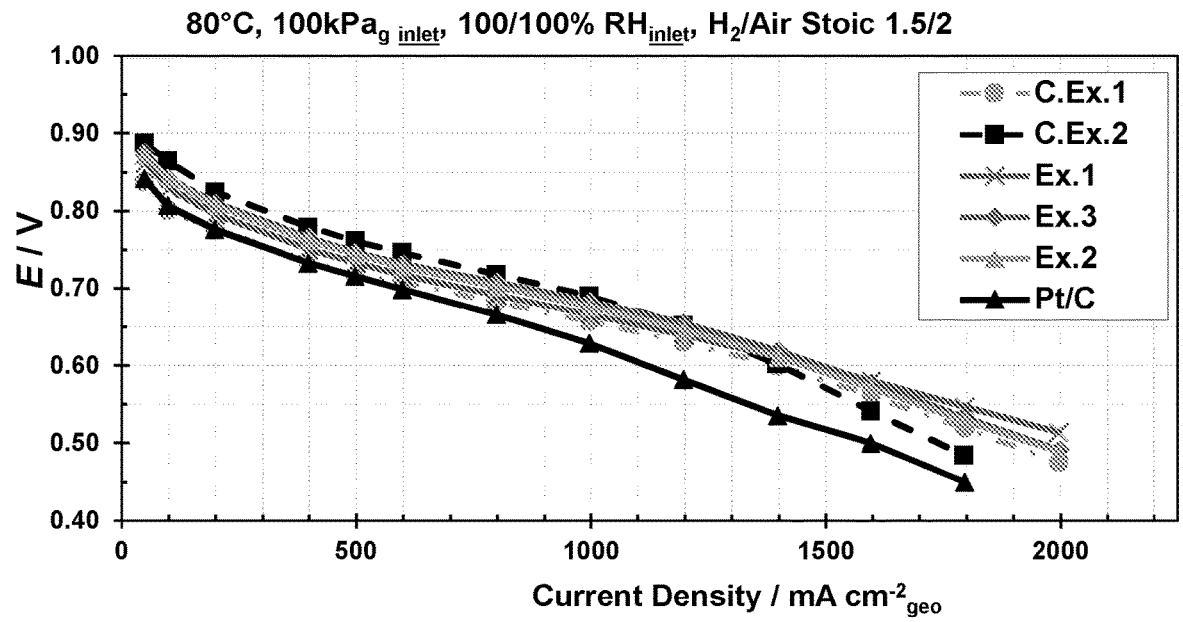
FIG. 1 is a plot showing voltage vs current density of MEAs comprising catalysts of Examples 1 to 3 and Comparative Examples 1 and 2, along with Pt/C, under $H_2$/air and fully humidified conditions.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

X is Co, Ni, Y, Gd, Sc or Cu. Accordingly, X is suitably Co, Ni or Cu. Alternatively, X is suitably Y, Gd or Sc. Preferably, X is Ni.

In the $Pt_aX_b$ alloy particle provided in step (i), the ratio of a to b is in the range of and including 10:1 to 1:2.5, suitably 5:1 to 1:2.5. When X is Co, Ni or Cu, the ratio of a to b is preferably in the range of and including 4:1 to 1:2.5, typically 3:1 to 1:2.5, for example 4:1 to 1:1, or 3:1 to 1:1.

The support material may itself be particulate and may be a carbon particle, for example, a commercially available carbon black (such as carbon blacks available from Cabot Corporation (Vulcan® XC72R) and AkzoNobel (Ketjen® Black series)) or a graphitised or modified version of these carbon blacks or other commercially available carbon blacks such as acetylene blacks (e.g. those available from Denka Co., Ltd). The carbon may also be one specifically designed for use in a fuel cell, such as those described in WO2013/045894. Alternatively, the particulate may be a metal oxide (e.g. titania, zirconia, silica or a mixed oxide, in particular a conductive mixed oxide such as niobia-doped titania, phosphorus-doped tin oxide and mixed platinum group metal oxides or mixed metal oxides as disclosed in WO2012/080726), a carbide (e.g. tungsten carbide or titanium carbide), a nitride, in particular a conductive nitride (e.g. titanium nitride or titanium aluminium nitride).

The support material comprises a plurality of individual support particles or aggregates. The phrase "individual support particle" means the smallest single moiety which is unable to be broken down into two or more smaller moieties, otherwise known as "primary particle". The term "aggregate" is used to refer to primary particles that have associated into a cluster composed of two or more primary particles, and which are permanently bound to each other; the total specific surface area of the aggregate is less than the sum of the surface areas of the primary particles before they were aggregated. Two or more individual support particles or aggregates can combine to provide an agglomerate. Agglomerates comprise loosely held individual support particles or aggregates held together by weak forces and can be readily broken down into the individual support particles or aggregates under imposition of low energy agitation.

The individual support particles or aggregates suitably have a mean particle or aggregate size in the range of and including 5 nm and 500 nm. Typically, individual support particles have a mean average particle size in the range of and including 10 to 70 nm, and the aggregates have a mean average particle size in the range of and including 100 nm to 500 nm. Agglomerates typically have a surface area of no less than 20 m²/g, suitably no less than 200 m²/g, typically no more than 2000 m²/g, suitably no more than 1000 m²/g, when measured by the BET nitrogen sorption method.

The supported $Pt_aX_b$ alloy particles provided in step (i) may be prepared by first co-depositing Pt and metal X on the support particles. For example, a solution of a Pt salt (e.g. $H_2PtCl_6$) in a suitable solvent (e.g. water) is added to a dispersion of support particles in a suitable medium (e.g. water), then a solution of a salt of metal X (e.g. a nitrate salt)

in a suitable solvent (e.g. water) is added. The mixture is then heated, cooled and filtered. The filtered material is dried and then annealed. In providing the supported $Pt_aX_b$ alloy particles, annealing is carried out at a temperature of suitably no more than 1000° C., typically no more than 800° C., in particular no more than 700° C. Annealing is suitably carried out at a temperature of no less than 400° C. For example, annealing may be carried out at about 600° C. Suitably, the Pt salt and the salt of metal X may be added simultaneously, or in the reverse order. Alternatively, any other general preparation methods known to those skilled in the art can be adapted to make the supported $Pt_aX_b$ alloy particles, such methods including colloidal deposition or controlled hydrolysis deposition methods.

In step (ii) of the processes, a shell of X is applied to the $Pt_aX_b$ alloy particles to provide a catalyst precursor comprising particles having a $Pt_aX_b$ core and an X shell. The shell is suitably no more than 3 atoms thick, typically no more than 2 atoms thick. Preferably, the shell is a monolayer i.e. it is 1 atom thick.

The shell may be applied using a controlled surface reaction. Prior to the controlled surface reaction, the precursor prepared in step (ii) of the process may be washed with an acid solution, e.g. a solution of $H_2SO_4$. A controlled surface reaction (CSR) is a redox reaction in which an adsorbed species is substituted with another species as documented by Tessier et al. in ECS Transactions, 16 (37) 1-11 (2009). The basis of the CSR technique is to add a metallic precursor selectively to the surface of a previously deposited (e.g. on a support) and pre-reduced metal nanoparticle substrate by chemical reaction. A usual approach is to cover the metal nanoparticle substrate with hydrogen, which can then react with a low-valence organometallic complex (metallic precursor). The CSR method requires the metallic precursor to react at the metal nanoparticle substrate surface or near it, so carbonyl complexes containing alkene ligands are usually selected. These ligands are then reduced and leave behind a monolayer thick layer of the metal used in the complex. Therefore, by using this method in sequence, a series of monolayers can be built on top of the metal nanoparticle substrate with control over the location of the deposited metal, ensuring it does not deposit on the support.

Accordingly, the controlled surface reaction in the present invention suitably involves the substitution of hydrogen adsorbed on the surface of the $Pt_aX_b$ alloy particles with metal X. The substitution is achieved by adding an organic complex of metal X, preferably in a solution, to a dispersion of $Pt_aX_b$ alloy particles which have hydrogen adsorbed on the surface. Accordingly, the controlled surface reaction involves forming a dispersion of $Pt_aX_b$ alloy particles in a suitable medium (e.g. a hydrocarbon solvent such as heptane or toluene), purging the dispersion with $H_2$ gas, then adding a solution of an organic complex of metal X, for example a (cyclopentadienyl)$_2$ or acetylacetonate hydrate complex of metal X.

Selection of the actual conditions for carrying out such a controlled reaction is within the capability of a skilled person. The actual conditions will depend on the identity of metal X and the identity of the complex used (i.e. which ligands are present). In the case of $Pt_3Ni$ alloy particles, a dispersion of the supported $Pt_3Ni$ alloy in a suitable medium (e.g. toluene or heptane) in an inert atmosphere (e.g. $N_2$) is provided. Then, the dispersion is purged with $H_2$ gas and heated, suitably to a temperature in the range of and including 100° C. to 300° C., preferably 150° C. to 250° C., for a time in the range of and including 30 minutes to 1.5 hours. Subsequently, a degassed solution (e.g. in toluene or heptane) of an organic complex of Ni, suitably [Ni(cyclopentadienyl)$_2$], is added to the dispersion. The dispersion may then be heated, suitably to a temperature in the range of and including, 50° C. to 150° C. The dispersion is then filtered to provide particles having a $Pt_3Ni$ core and a Ni shell.

Whilst it is particularly advantageous to use a controlled surface reaction, the shell of X may alternatively be applied using other thin film deposition methods such as atomic layer deposition, chemical vapor deposition or electrodeposition approaches such as underpotential deposition or related methods.

For preparing a catalyst material, after step (ii), a step (iii) of heating the catalyst precursor, preferably in an inert atmosphere such as $N_2$, at a temperature of no more than 900° C., is performed. Suitably, the heating is carried out at a temperature of no more than 850° C., for example no more than 800° C. The step (iii) of heating the catalyst precursor may be carried out at a temperature of at least 150° C., suitably at least 190° C., for example at least 200° C. Preferably, the step (iii) of heating the catalyst precursor is carried out at a temperature at least 400° C., more preferably at least 500° C., for example at least 600° C. The step of heating causes the metal shell to diffuse into the core of the material. The optimal temperature for this process is preferably at least 400° C., more preferably at least 500° C., for example at least 600° C. However, as demonstrated in the examples, a benefit is also seen when this heating step is carried out at a temperature of at least 150° C., suitably at least 190° C., for example at least 200° C. The time for which the catalyst precursor is heated is not particularly limited, providing that the catalyst precursor is held at the required temperature for a period of time. For example, the material may be held at the required temperature for a period of at least 10 minutes, suitably at least 30 minutes. For example, the material may be held at the required temperature for no more than 10 hours, suitably no more than 5 hours, typically no more than 3 hours. For example, the material may be held at the required temperature for approximately 1 hour or 2 hours. Whilst not wishing to be bound by theory, the lower temperature treatment required in comparison with known $PtNi_3$ catalysts is thought to contribute to the increased performance seen at high current densities due to less sintering and agglomeration of the alloy particles. Accordingly, it is advantageous that the heating step is performed at temperatures of no more than 900° C.

For preparing a catalyst material, after step (iii), the material produced in step (iii) is subjected to conditions sufficient to leach a portion of metal X from the material produced in step (iii). Suitably, leaching results in a reduction in the atomic percentage of the metal X at the surface of the particles, leaving the particles relatively richer in Pt near the surface of the particles. Put another way, the atomic percentage of metal X is less at the surface of a particles than in the rest of the particle. The bulk (i.e. overall) atomic ratio of Pt to metal X in the catalyst material is suitably in the range of and including 50:50 to 95:5, suitably 50:50 to 85:15. When X is Co, Ni or Cu, the bulk atomic ratio of Pt to metal X in the catalyst material is suitably in the range of and including 50:50 to 80:20, typically 50:50 to 75:25.

Leaching may be carried out by contacting the particles formed during step (iii) with an acidic solution, such as aqueous 0.5M sulfuric acid. The sulfuric acid solution may comprise an additional solvent such as an alcohol, suitably propanol. Typically, the particles may be exposed to an acidic solution, such as 0.5M sulfuric acid, for a period of time in the range of and including 1 to 48 hours, suitably 12 to 36 hours. The leaching process may be carried out more than once, suitably twice. Typically, the leaching process is carried out at a temperature of no more than 140° C., suitably no more than 120° C., preferably no more than 60° C. Typically, the leaching process is carried out at a temperature of at least 20° C., suitably at least 40° C., preferably at least 60° C. Accordingly, the leaching process may be carried out at a temperature in the range of and including 20° C. to 140° C., suitably 40° C. to 120° C., preferably 60° C. to 100° C. Determining the identity and concentration of the acidic solution and the time and temperature of leaching is within the capability of a skilled person.

The leaching process may also be carried out by subjecting the particles from step (iii) to an electrochemical reaction, which could be performed in situ (e.g. performing electrochemical cycling of an electrode or MEA comprising the material from step (iii)).

The invention further provides a catalyst material obtainable by the process according to the invention. Suitably, the catalyst material has a mean average particle size of no more than 10 nm, typically no more than 6 nm. Suitably, the catalyst material has a mean average particle size of at least 2 nm, typically at least 3 nm. The mean average particle size is determined by examination in a transmission electron microscope (TEM) and directly measuring the metal particles sizes. Typically, one to two hundred particles are measured in this way, to calculate the mean average particle size.

The catalyst materials obtainable by the process of the present invention have one or more improved properties over similar prior art catalysts, such as increased stability, and when incorporated into a MEA, the MEA demonstrates improved performance particularly at high current densities. Without wishing to be bound by theory, it is believed that the application of an X shell to $Pt_aX_b$ in the process of preparing a catalyst precursor permits lower temperature treatment during preparation of the catalyst material (e.g. less than 1000° C.). The lower temperature treatment facilitates improved performance of the catalyst material, particularly at higher current densities.

The catalyst layer of the invention may comprise additional components. Such components include, but are not limited to: an ion-conducting polymer, such as a proton conducting polymer, included to improve the ionic conductivity within the layer; an oxygen evolution catalyst; a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components will depend on whether the catalyst layer is for use at the anode or the cathode and it is within the capability of a skilled person to determine which additional components are appropriate.

To prepare the catalyst layer, the catalyst material of the invention and any additional components are dispersed in an aqueous and/or organic solvent to prepare a catalyst ink. If required, particle break-up is carried out by methods known in the art, such as high shear mixing, milling, ball milling, passing through a microfluidiser etc. or a combination thereof, to achieve a suitable particle size distribution.

After preparation of the catalyst ink, the ink is deposited onto a substrate (e.g. gas diffusion layer, ion-conducting membrane or a carrier/transfer substrate) to form the catalyst layer. The ink may be deposited by any suitable technique known to those in the art, including but not limited to: gravure coating, slot die (slot, extrusion) coating, screen printing, rotary screen printing, inkjet printing, spraying, painting, bar coating, pad coating, gap coating techniques such as knife or doctor blade over roll, and metering rod application.

The characteristics of the catalyst layer, such as the thickness, electrocatalyst loading, porosity, pore size distribution, average pore size and hydrophobicity will depend on whether it is being used at the anode or cathode. In particular, the catalyst layer is for use at the cathode. In an anode, the catalyst layer thickness is suitably at least 1 μm, typically at least 5 μm. In an anode, the catalyst layer thickness is suitably no more than 15 μm, typically no more than 10 μm. In a cathode, the catalyst layer thickness is suitably at least 2 μm, typically at least 5 μm. In a cathode, the catalyst layer thickness is suitably no more than 20 μm, typically no more than 15 μm.

The loading of platinum from the electrocatalyst in the catalyst layer will depend on whether it is being used at the anode or cathode. In an anode, the loading of platinum in the catalyst layer is suitably in the range of and including 0.02 to 0.2 mgPt/cm$^2$, typically 0.02 to 0.15 mgPt/cm$^2$, preferably 0.02 to 0.1 mgPt/cm$^2$. In a cathode, the loading of platinum in the catalyst layer is suitably in the range of and including 0.05 to 0.5 mgPt/cm$^2$, typically 0.05 to 0.3 mgPt/cm$^2$, preferably 0.1 to 0.2 mgPt/cm$^2$.

The catalyst layer may be deposited onto a gas diffusion layer to form a gas diffusion electrode of the invention. The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

In the catalyst coated membrane of the invention, the catalyst layer is deposited onto an ion-conducting membrane, either by direct coating of a catalyst ink onto the membrane, or indirectly by transfer from a carrier or transfer substrate, to form a catalyst coated membrane. The ion-conducting membrane may be any membrane suitable for use in a PEMFC, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.). Alternatively, the membrane may be based on a sulphonated hydrocarbon membrane such as those available from FuMA-Tech GmbH as the Fumapem®

P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane component may comprise one or more materials that confer mechanical strength to the ion-conducting membrane component. For example, the ion-conducting membrane component may contain a porous reinforcing material, such as an expanded PTFE material or a nanofibre network, such as an electro-spun fibre network.

The ion-conducting membrane may comprise one or more hydrogen peroxide decomposition catalysts either as a layer on one or both faces of the membrane, or embedded within the membrane, either uniformly dispersed throughout or in a layer. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting membrane component may optionally comprise a recombination catalyst, in particular a catalyst for the recombination of unreacted $H_2$ and $O_2$, that can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

When the catalyst layer is deposited onto a carrier/transfer substrate, by coating of a catalyst ink onto the carrier/transfer substrate, it forms a catalysed carrier/transfer substrate. The carrier/transfer substrate is intended to be removed from the layer in a subsequent step. For example, the catalyst layer may be transferred, by decal transfer, to a gas diffusion layer or ion-conducting membrane, the carrier/transfer substrate being removed immediately after, or at some point after, the transfer process.

Additional layers may be deposited on the exposed face of the catalyst layer prior to removal of the carrier/transfer substrate; for example, an ion-conducting ionomer layer may be applied from a dispersion of ionomer using any suitable deposition technique known as described above in relation to deposition of the catalyst layer. Further additional layers can be added as required, for example as described in PCT Patent Application No. GB2015/050864. The carrier/transfer substrate is removed from the catalyst layer at an appropriate time. The carrier/transfer substrate may be formed from any suitable material from which the catalyst layer can be removed without damage thereto. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

The invention will be further described with reference to the following examples which are illustrative and not limiting of the invention.

EXAMPLES

General Preparation Method for Examples 1 to 3

Step (i)—$Pt_aX_b$ Alloy Particles on a Support Material 100.0 g carbon (Ketjen EC 300J) was slurried in 8 L demineralised water and dispersed with a Silverson™ mixer. $NaHCO_3$ was then added to the mixture and the mixture was heated to reflux for 2 h. Then, 30.0 g Pt chloroplatinitic acid CPA 25.07% Pt (119.67 g, 0.1538 mol Pt) was dissolved in 1000 mL demineralised water. Afterwards, 3.01 g $Ni(NO_3)$ $H_2O$ (20.19% Ni) was dissolved in 700 mL demineralised water. The Pt salt mixture was then added to the carbon water mixture at a controlled flow rate and the mixture was allowed to boil for 10 mins. Afterwards, the prepared Ni mixture was added to the vessel and the temperature was brought back to boil. If necessary, $NaHCO_3$ was added to the mixture to return the pH to basic. The resulting mixture was heated to reflux for 10 mins before being allowed to cool with stirring overnight. The PtNi/C material was then filtered and washed until the conductivity of the filtrate was below 20 mS.

The PtNi/C material was then placed in multiple alumina boats and heated under $N_2$ to 600° C. at a controlled rate and held for 2 hours. The PtNi/C material was then allowed to cool to room temperature. XRD analysis revealed that the majority of the Pt and Ni had mixed to give a major cubic phase with a Pt to Ni atomic ratio of 73:27. Accordingly, the PtNi/C material is $Pt_3Ni/C$.

Step (ii)—Applying a Shell of X to the $Pt_aX_b$ Alloy Particles

The next step in the process involved the addition of [Ni(cyclopentadienyl)$_2$] to the PtNi/C material. 20.0 g of the PtNi/C material was mixed with 250 mL heptane and placed in a five neck 500 mL reaction flask with a condenser. The system was then evacuated and purged with $N_2$ five times then left under $N_2$ purge overnight. Afterwards, the mixture was purged with $H_2$ and heated to 200° C. and held at this temperature for 1 h before being cooled to room temperature. Meanwhile 500 mL of heptane was purged with $N_2$ for 1 h. Then, 5.25 g (0.0278 mol) of Ni[Ni(cyclopentadienyl)$_2$] was added to the purged heptane. This mixture was then transferred to a dropping funnel attached to the 500 mL reaction vessel containing the $Pt_3Ni/C$ mixture. The [Ni(cyclopentadienyl)$_2$] solution was then added to the mixture using $N_2$ pressure. When all the [Ni(cyclopentadienyl)$_2$] solution was added to the vessel the dropping funnel was isolated and then $H_2$ was bubbled through the mixture with heating at 90° C. for 5 h, before being allowed to cool down to room temperature overnight. The resulting PtNi/C material was then filtered and washed until the conductivity of the filtrate was below 20 mS. The PtNi/C material was assayed for Pt and Ni and revealed an atomic ratio of Pt (45.1) Ni (54.9).

Step (iii)—Heat Treating the Catalyst Precursor

Different amounts of the resulting PtNi/C material were then placed onto an alumina boat and heated under $N_2$ to 200, 600 or 800° C. at a controlled rate and held for 2 h at the final temperature. Example 1 was heated to 200° C., Example 2 was heated to 600° C., and Example 3 was heated to 800° C. The PtNi/C material was then allowed to cool to room temperature.

Step (iv)—Leaching a Portion of Metal X from the Material Produced in Step (iii)

After heating the PtNi/C materials were acid washed in a two-step leach at 0.05 g/mL to remove Ni from the surface of the PtNi/C materials. The first acid wash step was done in 0.5 M $H_2SO_4$ followed by a second step in a mixture of 0.5

M $H_2SO_4$ plus 20% propanol in water. In both cases, the suspension was stirred at 80° C. for 24 h. The catalyst powder was then washed with deionised water by vacuum filtration until the filtrate conductivity was below 20 mS. The catalyst powder was analysed by inductively coupled plasma mass spectrometry to obtain the bulk Pt:Ni ratio. In Example 1 the Pt:Ni ratio was 7.8:1, in Example 2 the Pt:Ni ratio was 2.5:1 and in Example 3 the Pt:Ni ratio was 2.2:1.

COMPARATIVE EXAMPLES

The materials used as Comparative Examples are the $Pt_3Ni/C$ material prepared in step (i) above (Comparative Example 1) and a benchmark annealed (1000° C.) and de-alloyed $PtNi_3/C$ catalyst material (Comparative Example 2), along with a Pt/C comparison.

To prepare the benchmark annealed (1000° C.) and de-alloyed $PtNi_3/C$ catalyst, a particulate carbon black supported nanoparticle platinum (Pt/C) material was first prepared using a method analogous to the general method of preparation of carbon supported platinum catalysts described in WO2013/045894. A solution of nickel nitrate (10.66 g; 3.43 g, 0.0585 mol Ni) in water was added (3 ml $g^{-1}$ C) in aliquots to the dried Pt/C catalyst (19.0 g; 3.8 g, 0.0195 mol Pt) and mixed to ensure a homogeneous dispersion. Once deposition was complete the PtNi/C material was recovered, dried and annealed in a reducing atmosphere of 5% $H_2/N_2$ at 1000° C. for one hour to alloy the platinum and nickel. The alloyed PtNi/C material was then washed in aqueous and subsequently alcoholic $H_2SO_4$ solution (20 ml $g^{-1}$ material) to leach out at least a portion of the Ni; both washing steps were carried out at 80° C. for 24 hours.

MEA Fabrication

Catalyst coated ion-conducting membranes (CCMs) of 50 $cm^2$ active area were prepared by depositing anode and cathode catalyst layers onto a PTFE sheet and transferring the appropriate layers to either side of a PFSA reinforced membrane (20 μm thickness) at a temperature of between 150° C. to 200° C. Examples 1 to 3 and the Comparative Examples were used to form the cathode catalyst layer; the anode catalyst layer in each CCM comprised a commercially available anode catalyst (HiSPEC® 9100 with a nominal Pt loading of 60 wt % Pt on the carbon support) at a loading of 0.1 mgPt/$cm^2$.

A gas diffusion layer was applied to each face of each CCM to form the complete MEA. The gas diffusion layer used was a carbon fibre paper with a hydrophobic microporous layer containing carbon and PTFE applied to the face in contact with the CCM.

MEA Performance Testing

Figure 1A:
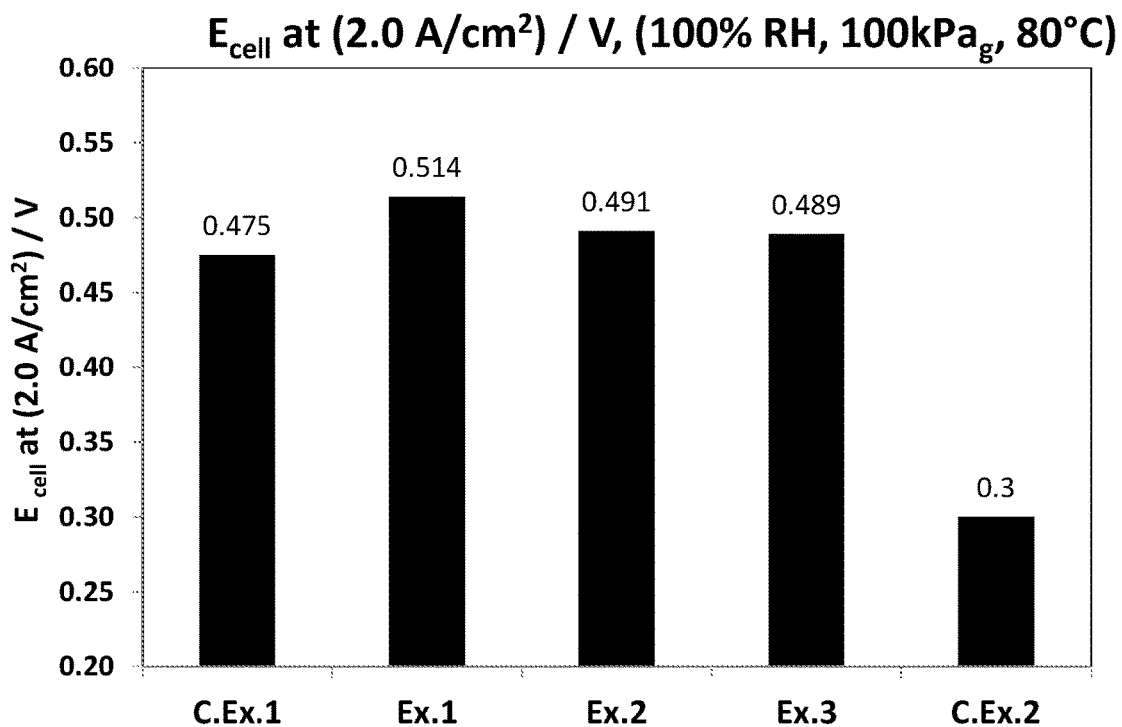
FIG. 1A is a chart showing the voltage at a current density of 2.0 A/cm² (high current density) for MEAs comprising catalysts of Examples 1 to 3 and Comparative Examples 1 and 2 under $H_2$/air and fully humidified conditions.
Figure 2:
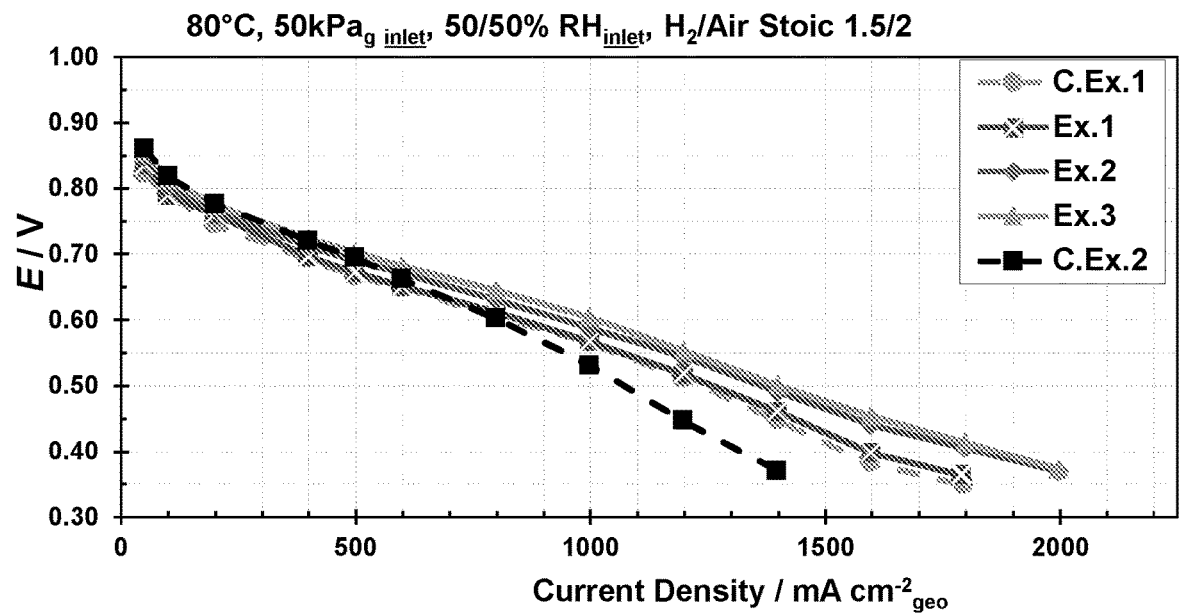
FIG. 2 is a plot showing voltage vs current density of MEAs comprising catalysts of Examples 1 to 3 and Comparative Examples 1 and 2, under $H_2$/air and drier conditions.
Figure 2A:
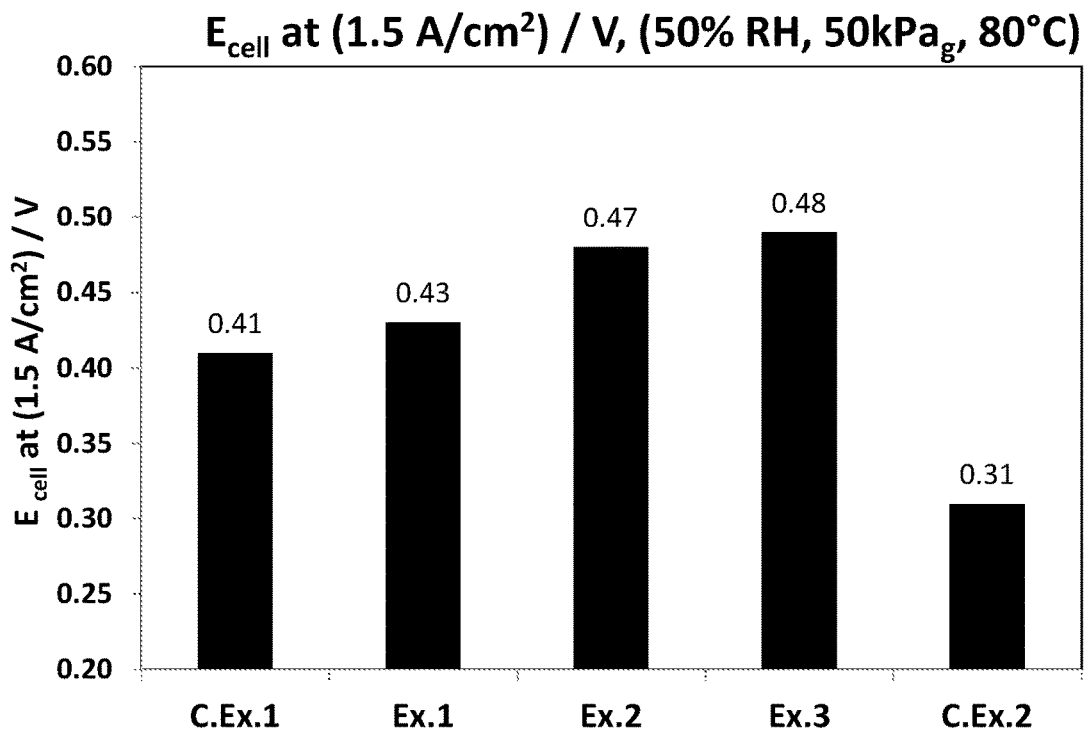
FIG. 2A is a chart showing the voltage at a current density of 1.5 A/cm² (high current density) for MEAs comprising catalysts of Examples 1 to 3 and Comparative Examples 1 and 2 under $H_2$/air and drier conditions.

The polarisation (current vs voltage) performances of the 50 $cm^2$ MEAs were measured in $H_2$/air at 80° C. under fully humidified and pressurised cathode (100% RH, 100 $kPa_{gauge}$) and reduced humidification cathode (50% RH, 50 $kPa_{gauge}$) conditions. In all measurements, the cell humidity (RH) and pressure was controlled at the anode and cathode inlets. FIG. 1 is a plot of the polarisation curve for fully humidified conditions. FIG. 2 is a plot of the polarisation curve for drier conditions. The cell voltages at 2.0 A/$cm^2$ (fully humidified conditions) and 1.5 A/$cm^2$ (reduced RH conditions) are shown in FIG. 1A and FIG. 2A respectively i.e. FIG. 1A is a chart taking the data points for 2.0 A/$cm^2$ from the plot in FIG. 1 (the value provided for C.Ex.2 is an extrapolation from the curve in FIG. 1) and FIG. 2A is a chart taking the data points for 1.5 A/$cm^2$ from the plot in FIG. 2 (the value provided for C.Ex.2 is an extrapolation from the curve in FIG. 2).

The benefit of catalyst materials prepared by the process of the invention is particularly seen at high current density under humidified (100% RH) and reduced RH conditions (50% RH). FIGS. 1A and 2A in particular show the better performance of MEAs prepared using the catalyst materials of Examples 1 to 3, as compared to Comparative Examples 1 and 2, in particular Comparative Example 2. As can be seen by the performance of Example 1 as compared to the Comparative Examples, heating to a temperature of greater than 400° C. is not required to see a benefit.

Electrochemical Measurement of Surface Area

The catalyst powder (0.5 g) was weighed and mixed with Nafion® 1100 EW ionomer solution at a 110% ionomer to carbon ratio. The ink was mixed at 3000 rpm for one minute. Afterwards five yttria stabilised zirconium oxide grinding beads were added to the mixing pot and mixed at 3000 rpm for a further 2 minutes. The ink was brush painted to Toray® TGPH-60 paper used as the gas diffusion layer. The Pt loading was set at 0.40 mg Pt/$cm^2$ and calculated by weight difference. The ink layer was dried on a Stuart SD160 hotplate at 85° C. before measuring the mass of the painted button to determine if a second layer was required. The layers of ink were applied in this way until the required loading was achieved. The middle of each button was cut out to obtain a circular electrode with 20 mm diameter. Before electrochemical testing, the electrodes were wetted overnight in 1 M $H_2SO_4$ under vacuum at 200 mbar to ensure that the electrolyte penetrates the whole electrode and is fully wetted. This way full utilisation of the catalyst layer is achieved.

A 250 mL three electrode glass cell was used for electrochemical experiments. The working electrode with the coated catalyst, reference electrode and counter electrode, were connected in an electrical circuit with a potentiostat (AUTOLAB PGSTAT30). The counter electrode was a coiled Pt wire, the reference electrode was a reversible hydrogen electrode (RHE) made up of a Pd/C catalyst on carbon Toray paper bubbled with $H_2$ gas. The electrolyte was 150 ml of 1 M $H_2SO_4$ from Fisher Scientific, purged with nitrogen gas from a glass tube with a fritted end. A water bath at 80° C. was fitted at the bottom of the cell and the cell was placed inside a fume hood with extraction for the duration of testing.

The electrochemical area of the electrodes (ECA) was measured by oxidative stripping of a preadsorbed CO layer (CO stripping). In this case, the electrode potential was held at 0.125V vs RHE and the cell was purged with 100% CO gas for 15 minutes, to allow for saturated adsorption of CO to the catalytic electrode surface. The cell was then purged with $N_2$ for 30 minutes to remove residual CO from the solution. Finally, linear sweep voltammetry was conducted between 0.1-1.0 V at 50 mV/s. The peak in current density due to oxidative removal of the CO adsorbed layer was integrated between 0.3-0.8 V, to find the charge used for CO oxidation, with respect to the baseline voltammogram.

The constant relating the charge to the electrochemical surface area with respect to the geometric surface area of the electrode) was 420 μC $cm^{-2}$ Pt for CO oxidation. Dividing these values by the Pt loading on the electrode gave the ECA, as shown by equations below.

$$EPSA_{CO}(cm_{Pt}^2 cm^{-2}) = \left(\frac{charge\ (C)}{420 \times 10^{-6}(C\ cm_{Pt}^{-2})}\right) \div area\ (cm^2)$$

$$ECA(m_{Pt}^2 g_{Pt}^{-2}) = \left(\frac{EPSA(cm_{Pt}^2 cm^{-2})}{loading\ (mg\ cm^{-2})}\right) \div 10$$

Figure 3:
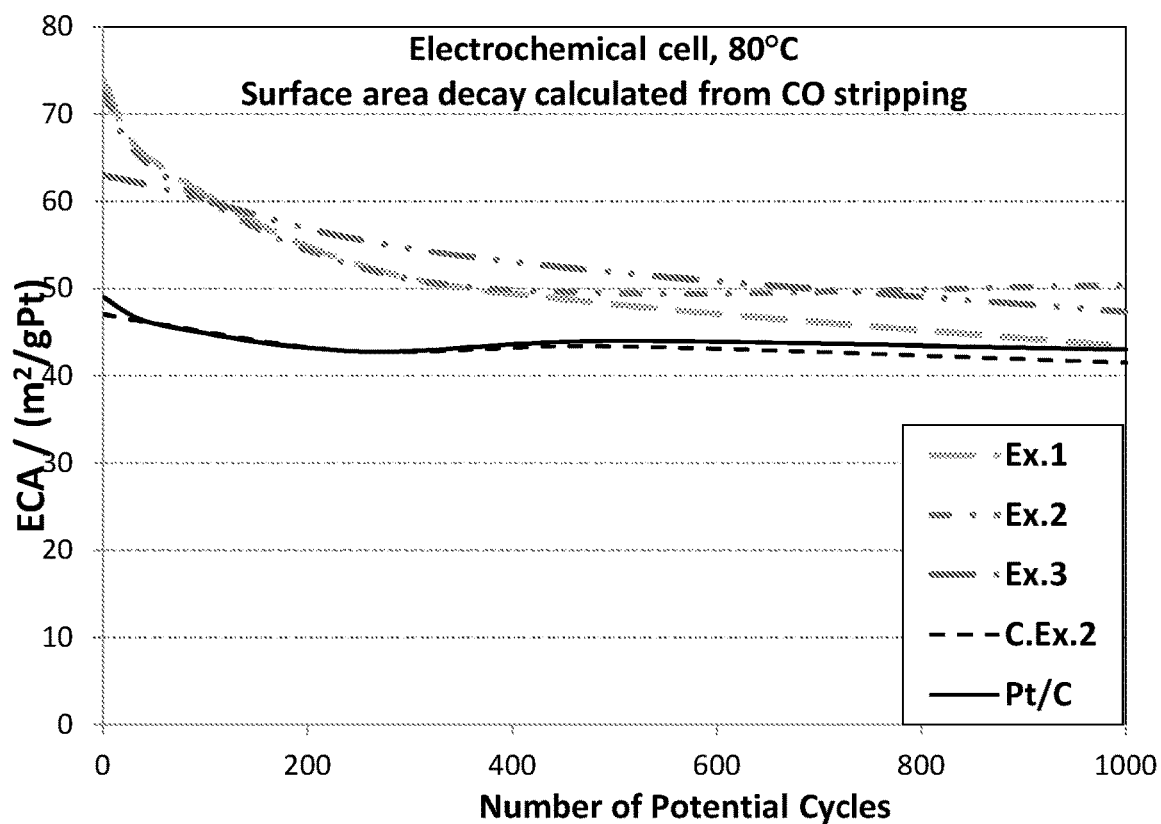
FIG. 3 is a plot showing change in electrochemical surface area over a number of cell reversal cycles for Examples 1 to 3, a Pt/C comparison, and Comparative Example 2.

As can be seen in FIG. 3, Examples 2 and 3 have a higher ECA than C.Ex.2 and Pt/C even after a large number of potential cycles.

The invention claimed is:

1. A process for preparing a catalyst material, said process comprising the steps of:
   (i) providing $Pt_aX_b$ alloy particles on a support material;
   (ii) applying a shell of X to the $Pt_aX_b$ alloy particles to provide a catalyst precursor comprising particles having a $Pt_aX_b$ core and a shell of metal X atoms; then
   (iii) heating the catalyst precursor at a temperature of no more than 900° C., whereby the heating causes the shell to diffuse into the core; then
   (iv) subjecting the heated catalyst precursor produced in step (iii) to conditions sufficient to leach a portion of metal X therefrom;
   wherein the ratio of a to b is in the range of and including 10:1 to 1:2.5; and
   wherein X is Co, Ni, Y, Gd, Sc or Cu.

2. The process according to claim 1, wherein in step (iii) the catalyst precursor is heated at a temperature of at least 150° C.

3. The process according to claim 1, wherein step (ii) is performed by carrying out a controlled surface reaction.

4. The process according to claim 1, wherein X is Co, Ni or Cu.

5. The process according to claim 1, wherein X is Y, Gd or Sc.

6. The process according to claim 1, wherein the ratio of a to b is in the range of and including 5:1 to 1:2.5.

7. The process according to claim 1, wherein step (iv) is carried out by acid washing.

* * * * *